(12) United States Patent
Towles

(10) Patent No.: US 7,346,049 B2
(45) Date of Patent: Mar. 18, 2008

(54) SCHEDULING CONNECTIONS IN A MULTI-STAGE SWITCH TO RETAIN NON-BLOCKING PROPERTIES OF CONSTITUENT SWITCHING ELEMENTS

(76) Inventor: Brian Patrick Towles, 121 Campus Loop Dr., Apt. #3209B, Stanford, CA (US) 94305

( * ) Notice: Subject to any disclaimer, the term of this patent is extended or adjusted under 35 U.S.C. 154(b) by 1057 days.

(21) Appl. No.: 10/370,037

(22) Filed: Feb. 19, 2003

(65) Prior Publication Data

US 2003/0214944 A1 Nov. 20, 2003

Related U.S. Application Data

(60) Provisional application No. 60/381,870, filed on May 17, 2002.

(51) Int. Cl.
*H04L 12/50* (2006.01)
(52) U.S. Cl. ...................................... 370/386; 370/388
(58) Field of Classification Search ......... 370/380–388
See application file for complete search history.

(56) References Cited

U.S. PATENT DOCUMENTS

| | | | |
|---|---|---|---|
| 3,576,398 A | 4/1971 | Dejean et al. | |
| 3,632,883 A | 1/1972 | Augaard | |
| 3,735,049 A | 5/1973 | Buchner et al. | |
| 3,736,381 A | 5/1973 | Johnson et al. | |
| 3,832,492 A | 8/1974 | Charransol et al. | |
| 3,927,267 A | 12/1975 | Voyer et al. | |
| 4,004,103 A | 1/1977 | Liu et al. | |
| 4,035,584 A | 7/1977 | Lurtz | |
| 4,038,638 A | 7/1977 | Hwang | |
| 4,123,624 A | 10/1978 | Gagnier et al. | |
| 4,394,541 A | 7/1983 | Seiden | |
| 4,470,139 A | 9/1984 | Munter | |
| 4,566,007 A | 1/1986 | Richards | |
| 4,764,918 A | 8/1988 | Waters | |
| 4,771,420 A | 9/1988 | Deschaine et al. | |
| 4,797,589 A | 1/1989 | Collins | |
| 4,817,083 A | 3/1989 | Richards | |
| 4,849,964 A | 7/1989 | Van Baardewijk | |
| 4,935,921 A | 6/1990 | Ishizaki et al. | |
| 4,967,405 A | 10/1990 | Upp et al. | |
| 5,040,170 A | 8/1991 | Upp et al. | |
| 5,111,414 A | 5/1992 | Arrathoon | |
| 5,144,297 A | 9/1992 | Ohara | |
| 5,189,410 A | 2/1993 | Kosugi et al. | |
| 5,311,506 A | 5/1994 | Beisel | |
| 5,323,390 A | 6/1994 | Pawelski | |

(Continued)

OTHER PUBLICATIONS

Hwang, Frank K., et al., "On Nonblocking Multicast Three-State Clos Networks", IEEE/ACM *Transactions on Networking*, vol. 8(4), 535-539 (2000).

(Continued)

*Primary Examiner*—Steven Nguyen
(74) *Attorney, Agent, or Firm*—Christopher P. Maiorana P.C.

(57) ABSTRACT

A scheduling algorithm is provided that may be implemented in a multi-stage switch requiring less switching elements than known switching architectures in order to increase bandwidth and to retain the non-blocking properties of the constituent switching elements for incoming traffic, including multicast traffic. A scheduling algorithm is also provided for incremental scheduling of connections being added or removed from the switch.

26 Claims, 14 Drawing Sheets

U.S. PATENT DOCUMENTS

| | | |
|---|---|---|
| 5,345,441 A | 9/1994 | Paker et al. |
| 5,408,231 A | 4/1995 | Bowdon |
| 5,430,716 A | 7/1995 | Pawelski |
| 5,436,890 A | 7/1995 | Read et al. |
| 5,469,154 A | 11/1995 | Karp |
| 5,526,359 A | 6/1996 | Read et al. |
| 5,629,932 A | 5/1997 | Kim |
| 5,987,027 A | 11/1999 | Park et al. |
| 6,034,947 A | 3/2000 | Yoshida et al. |
| 6,041,055 A | 3/2000 | Chopping |
| 6,816,487 B1 * | 11/2004 | Roberts et al. .............. 370/388 |
| 6,885,669 B2 * | 4/2005 | Konda ..................... 370/395.1 |

OTHER PUBLICATIONS

Benes, V.E., "On Rearrangeable Three-Stage Connecting Networks," The Bell System Technical Journal, vol. XLI, No. 5, Sep. 1962, pp. 1481-1492.

Clos, Charles, "A Study of Non-Blocking Switching Networks," Bell System Technical Journal, Mar. 1953, pp. 406-424.

"Lucent Technologies introduces cross-connect ship for high-speed optical networking systems," 1999, http://www.chipcenter.com/telecommunications/mdp/webscan/mn00e/mn00e016.htm; 2 pages.

"900-Series DSX (Digital Signal Cross-Connect) System," 1996, http/connectivity1.avaya.com/exchangemax/fact_sheets/pdf/2883fs-3.pdf, 6 pages.

Benes, V.E., "Mathematical Theory of Connecting Networks and Telephone Traffic", *Academic Press,* 1965, pp. 82-95.

* cited by examiner

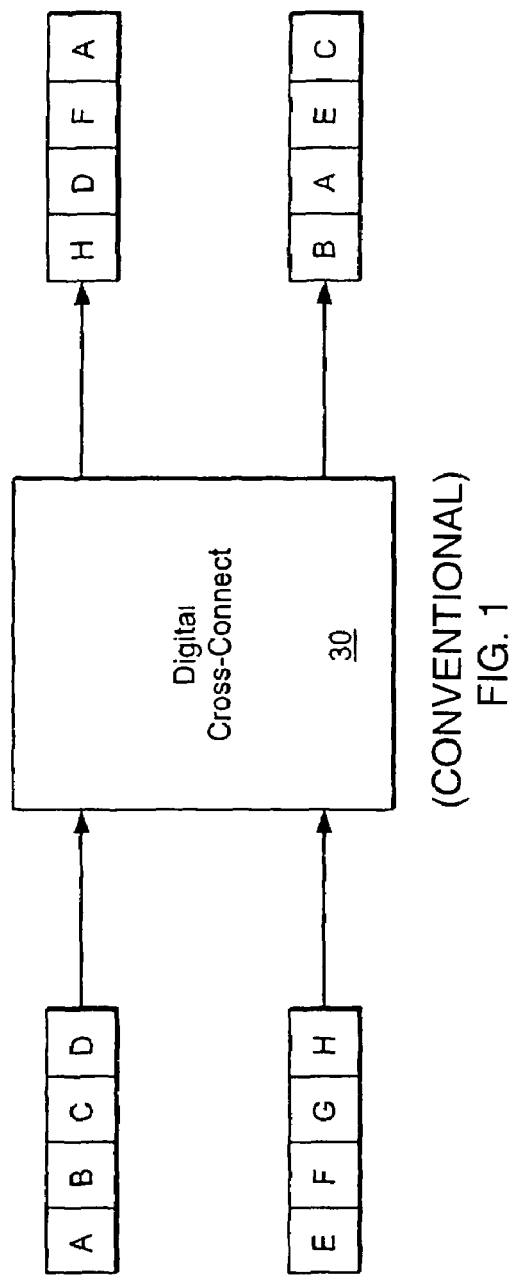
(CONVENTIONAL)
FIG. 1
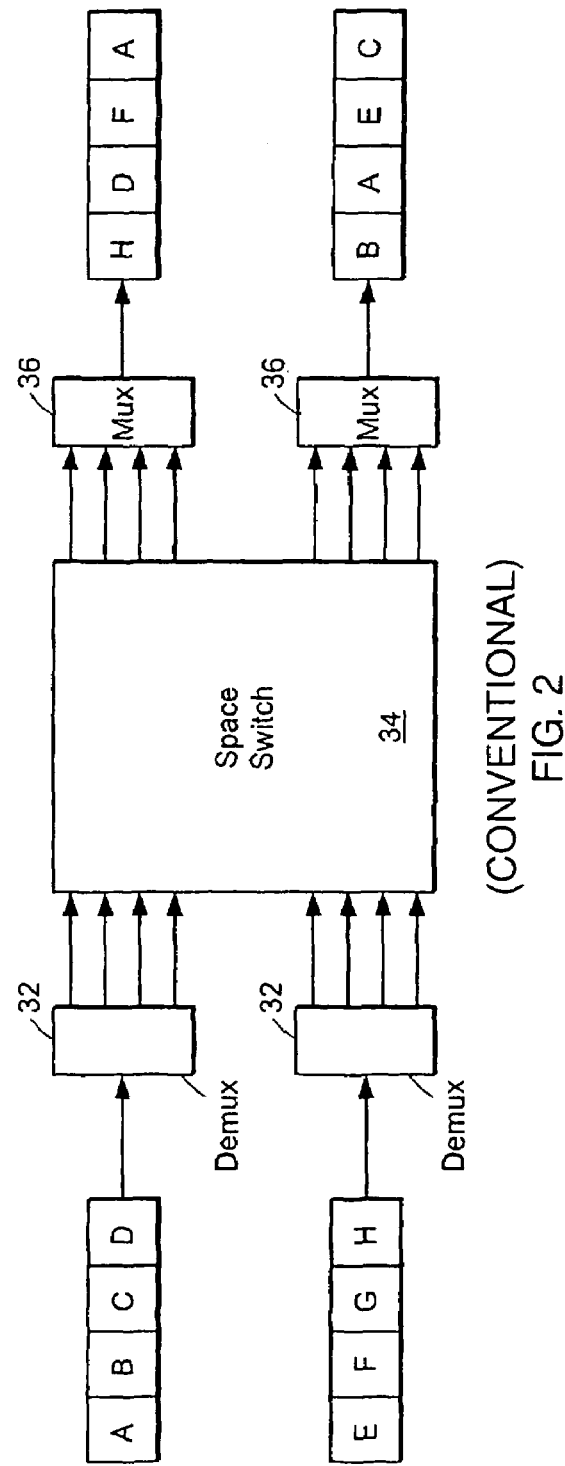
(CONVENTIONAL)
FIG. 2

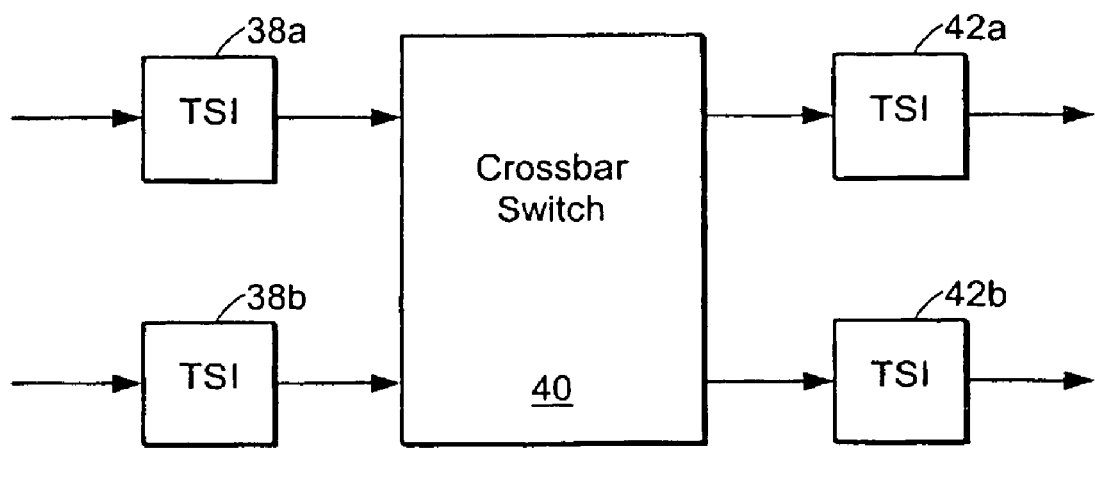
(CONVENTIONAL)
FIG. 3

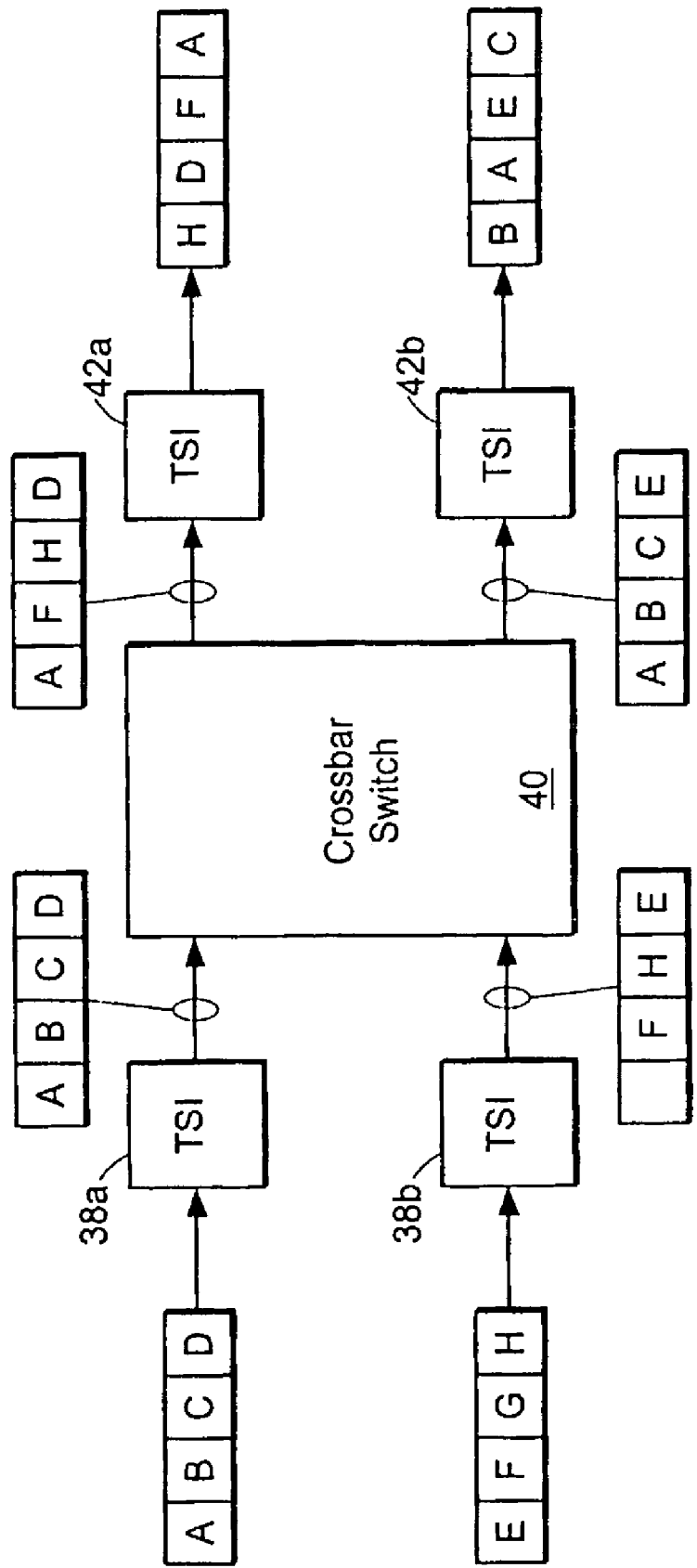
(CONVENTIONAL)
FIG. 4

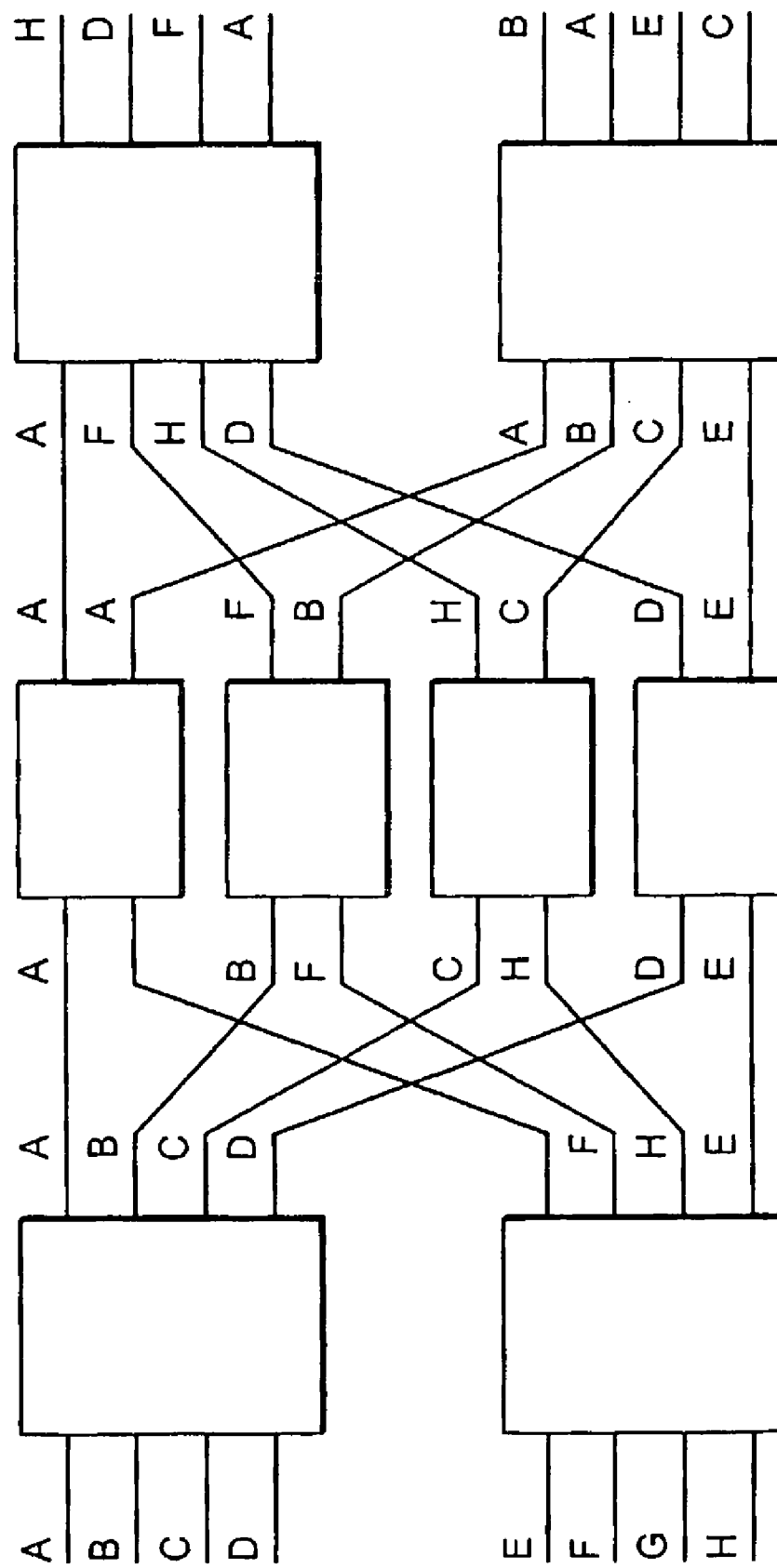
FIG. 5 (CONVENTIONAL)

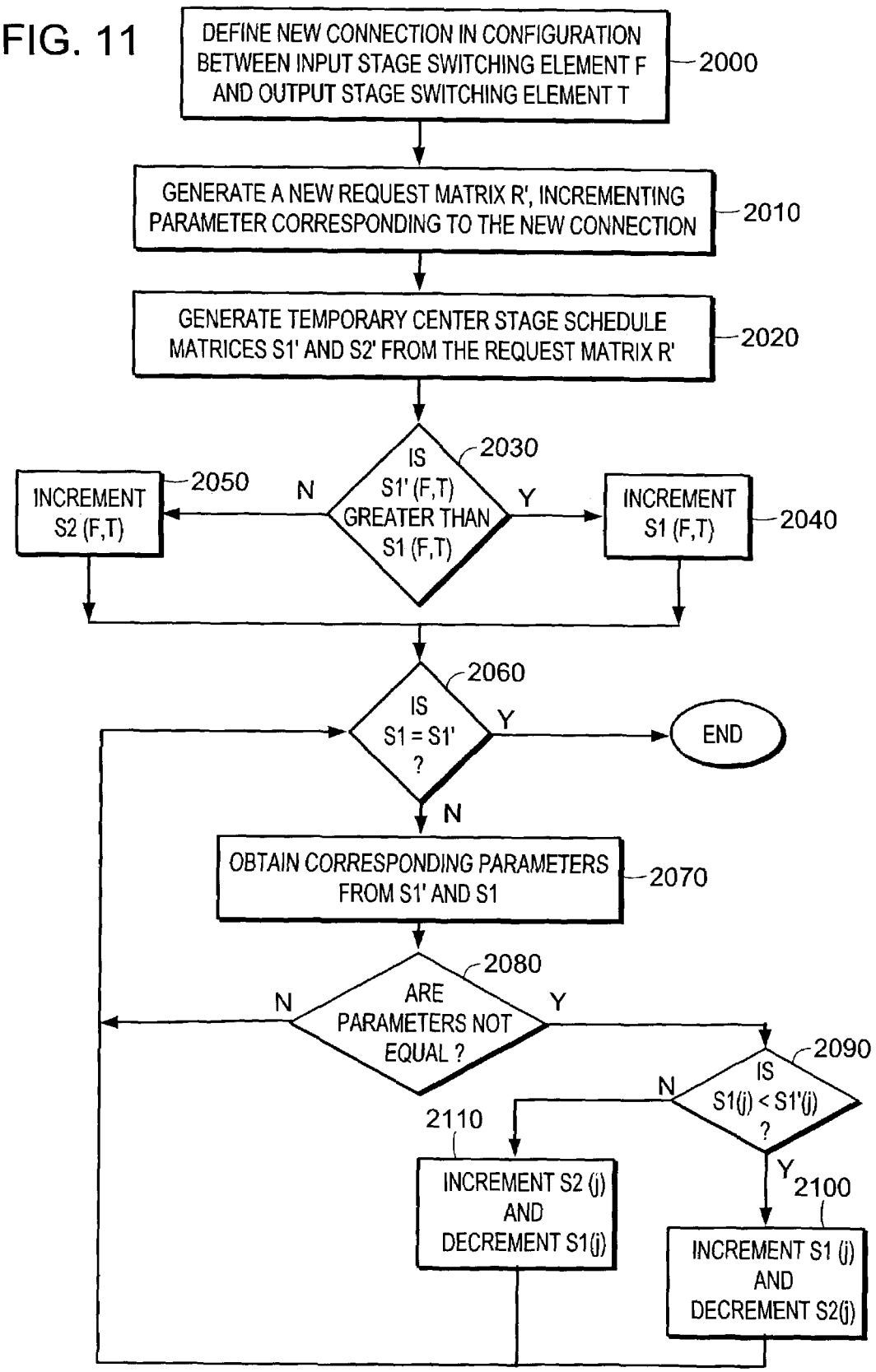

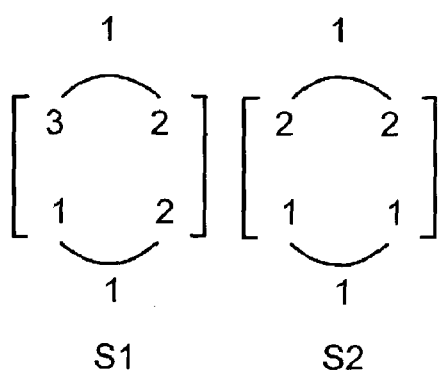
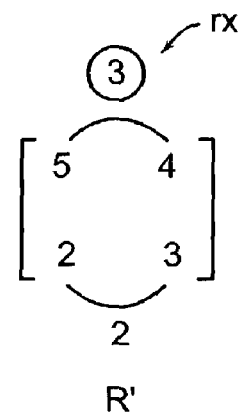
FIG. 12A          FIG. 12B
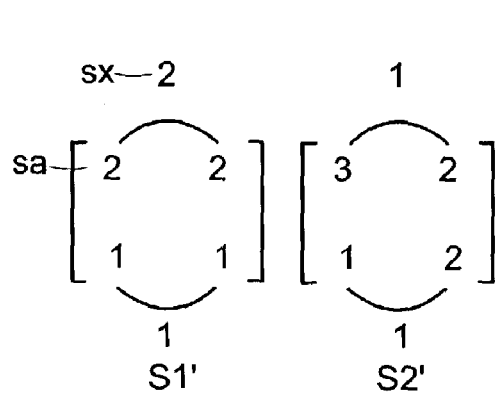
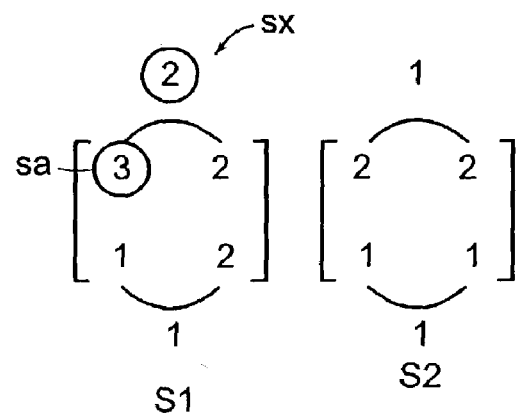
FIG. 12C          FIG. 12D
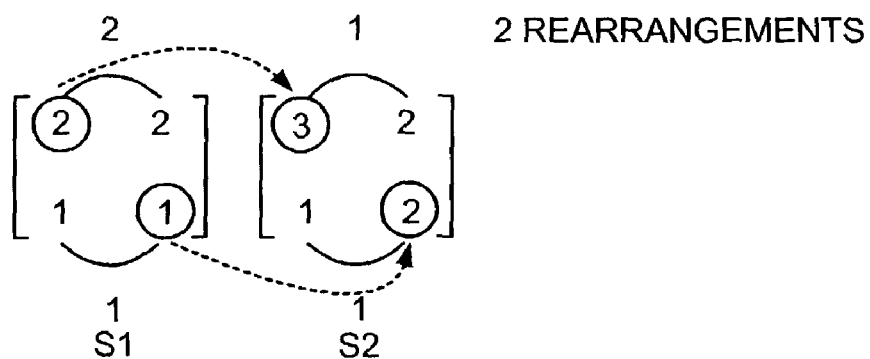
FIG. 12E

US 7,346,049 B2

SCHEDULING CONNECTIONS IN A MULTI-STAGE SWITCH TO RETAIN NON-BLOCKING PROPERTIES OF CONSTITUENT SWITCHING ELEMENTS

RELATED APPLICATION

This application claims the benefit of U.S. Provisional Application No. 60/381,870, filed May 17, 2002. The entire teachings of the above application is incorporated herein by reference.

BACKGROUND OF THE INVENTION

Telecommunications channels often carry traffic that is multiplexed from several sources. For example, a 2.488 Gb/s SONET STS-48 channel carries 48 51.84 Mb/s SONET STS-1 channels that are time multiplexed on a byte-by-byte basis. That is, the channel carries bytes 1.1, 2.1, 3.1, . . . , 48.1, 1.2, 2.2, 3.2, . . . , 48.2, 1.3, 2.3, 2.3, . . . where n.m denotes byte m of subchannel n. Details of the SONET format can be found in Ming-Chwan Chow, Understanding SONET/SDH: Standards & Applications, Andan Pub, ISBN 0965044823, 1995 and in ANSI Standard T1.105-1995.

An STS-1 SONET frame is a repeating structure of 810 bytes arranged into 9 rows of 90 columns. The frame structure is transmitted in row-major order. That is, all 90-bytes of row 0 are transmitted, then all 90 bytes of row 1, and so on. At higher multiplexing rates, each byte of the STS-1 frame is replaced by a number of bytes, one from each of several multiplexed sources. For example, at STS-48, 48 bytes, one from each of 48 STS-1 subframes, are transmitted during each column interval. In this case, the order of transmission is to send all 48 subframe bytes for one column before moving on to the next column and to send all of the columns of a row before moving on to the next row.

A digital cross connect is a network element that accepts a number of multiplexed data channels, for example 72 STS-48 channels, and generates a number of multiplexed output channels where each output channel carries an arbitrary set of the subchannels from across all of the input ports. For example, one of the STS-48 output channels may contain STS-1 channels from different input channels in a different order than they were originally input.

An example of digital cross connect operation is shown in FIG. 1. The figure shows a cross connect 30 with two input ports and two output ports. Each of these ports contains four time slots. Input port 1 (the top input port) carries subchannels A, B, C, and D in its four slots and input port 2 (the bottom port) carries subchannels E, F, G, and H in its four time slots. Each time slot of each output port can select any time slot of any input port. For example, output port 1 (top) carries subchannels H, D, F, and A from 2.4, 1.4, 2.2, 1.1 where x.y denotes input port x, timeslot y. Input timeslots are typically switched in both space and time. The first time slot of output port 1, for example, is switched in time from slot 4 to slot 1 and in space from port 2 to port 1. Also, some time slots may be duplicated (i.e., multicast) and others dropped. Subchannel A, for example, appears in output time slots 1.4 and 2.2 and subchannel G is dropped, appearing on no output time slot.

A digital cross connect can be implemented in a straightforward manner by demultiplexing each input port, switching all of the time slots of all of the input ports with a space switch, and then multiplexing each output port. This approach is illustrated in FIG. 2. The four time slots of input port 1 are demultiplexed in demultiplexers 32 so that each is carried on a separate line. All of these demultiplexed lines are then switched by a space switch 34 to the appropriate output time slots. Finally, a set of multiplexers 36 multiplexes the time slots of each output channel onto each output port. This approach is used, for example, in the systems described in U.S. Pat. Nos. 3,735,049 and 4,967,405.

The space-switch architecture for a digital cross connect as shown in FIG. 2 has the advantage that it is conceptually simple and strictly non-blocking for any type of traffic, including unicast and multicast traffic. A switch architecture is strictly non-blocking if an existing configuration can be augmented to handle any new connection between an idle input time slot and an idle output time slot without changing the time slots assigned to any existing connection. However, this space-switch architecture results in switches that are too large to be economically used for large cross connects. For example, a digital cross connect with P=72 ports and T=48 time slots requires a PT×PT (3456×3456) space switch with $P^2T^2$=11,943,936 cross points. Further, this large switch will be operated at a very slow rate. It will only need to switch a new batch of input time slots after T bytes have been received. Thus, it operates at a 1/T byte rate.

A more economical digital cross connect can be realized using a time-space-time (T-S-T) switch architecture as illustrated in FIG. 3. Here each input port is input to a time-slot interchanger (TSI) 38a, 38b. A TSI switches a multiplexed input stream in time by interchanging the positions of the time slots. To switch time-slot i to time-slot j, for example, slot i is delayed by T+j−i byte times. The multiplexed streams out of the input TSIs are then switched by a P x P space switch 40 that is reconfigured on each time slot. The outputs of this space switch are switched in time again by a set of output TSIs 42a, 42b. This T-S-T architecture is employed, for example, by the systems described in U.S. Pat. Nos. 3,736,381 and 3,927,267.

An example of the operation of a T-S-T digital cross connect on the configuration of FIG. 3 is shown in FIG. 4. Here the TSI 38a for input port 1 does not change the positions of its input time slots. The input TSI 38b for port 2, however, reorders its time slots from E, F, G, H, to -, F, H, E. The G here is dropped as it is not used by any output ports. The space switch 40 takes the outputs of the two input TSIs 38a, 38b and switches them, without changing time slots, to create the streams A, F, H, D and A, B, C, E. Note that this involves a dualcast of timeslot A to both outputs. Finally, the output TSIs 42a, 42b reorder these streams to give the output streams H, D, F, A and E, A, B, C.

A three-stage T-S-T digital cross connect is logically equivalent to a 3-stage Clos network with P T×T input stages, T P×P center stages, and P T×T output stages. For example, FIG. 5 shows the configuration of FIG. 4 on an equivalent 3-stage S-S-S (space-space-space) Clos network. To route a configuration of input time slots to output time slots on a Clos switch network switch, a center stage time slot must be assigned to each connection. This routing in a Clos network is described in detail in Clos, Charles, "A Study of Non-Blocking Switching Networks," Bell System Technical Journal, March 1953, pp. 406-424, and V. E. Benes, "On Rearrangeable Three-Stage Connecting Networks," *The Bell System Technical Journal*, vol. XLI, No. 5, September 1962, pp. 1481-1492. These references show that a three-stage Clos network is rearrangeably non-blocking for unicast traffic but cannot, in general route multicast traffic. A network is rearrangeably non-blocking, or rearrangeable, if for every input to output connection, there exists an assignment of center stage time slots that will route that connection.

In the past this scheduling problem was solved using a looping algorithm that is described in Benes, *The Mathematical Theory of Connecting Networks*, 1964. There have been many minor variations to this basic scheduling algorithm. U.S. Pat. No. 3,576,398 describes a scheduling algorithm that prioritizes the scheduling of certain connections over others. U.S. Pat. No. 4,004,103 describes a scheduling algorithm that randomizes the allocation of paths. U.S. Pat. No. 5,345,441 allocates different sized contiguous blocks of calls. U.S. Pat. No. 5,430,716 describes a method for scheduling multicast and broadcast calls. U.S. Pat. No. 5,987,027 describes a rearrangement algorithm for scheduling multicast calls. U.S. Pat. No. 6,034,947 describes the use of scheduling for protection switching. U.S. Pat. No. 5,408,231 describes another alternative implementation.

SUMMARY

In order to increase the bandwidth provided by a single switching element, it is known to implement a Clos network of at least eight (8) switching elements, as shown in FIG. 5. A number of scheduling algorithms, including those previously mentioned, have been implemented in such Clos architectures to provide non-blocking operation when forwarding unicast and multicast traffic. However, none of the known scheduling algorithms provide non-blocking operation for unicast and multicast traffic in a switch architecture having less switching elements.

Embodiments of the invention include a scheduling algorithm that implements a method of scheduling connections in a multi-stage switch, resulting in less switching elements being required than known switching architectures to increase bandwidth and to retain the non-blocking properties of the constituent switching elements for incoming traffic, including multicast traffic. A scheduling algorithm is also provided that implements a method of incremental scheduling of connections being added or removed in a multi-stage switch, resulting in rapid reconfiguration of the switch due to a limited number of rearrangements that are required.

Particular embodiments of the invention include a multi-stage switch with two input stage switching elements, two output stage switching elements, and two center stage switching elements coupling the two input stage switching elements to the two output stage switching elements. Each of the respective switching elements have non-blocking properties for incoming traffic, including multicast traffic. A processor coupled to at least the two center stage switching elements may implement a scheduling algorithm according to an embodiment of the invention.

Such embodiments schedule a configured set of input/output connections including multicast connections between the two center stage switching elements according to a scheduling pattern in order to minimize the difference in the numbers of connections scheduled for the respective center stage switching elements that originate from a common input stage switching element and to minimize the difference in the numbers of connections scheduled for the respective center stage switching elements that are destined for a common output stage switching element. Such embodiments result in the non-blocking properties of the respective switching elements being retained, because substantially equal numbers of connections originating from each input stage switching element and destined for each output are scheduled between the two center stage switching elements. According to one embodiment, each difference being minimized is at most two connections.

Particular embodiments generate the scheduling pattern from parameters that are generated from a configured set of input/output connections. Each parameter specifies a number of connections originating from one of the two input stage switching elements and destined for at least one of the two output stage switching elements. The scheduling pattern is then generated from these parameters, such that each center stage switching element is scheduled substantially equal numbers of connections originating from each input stage switching element and destined for each output stage switching element. In particular, the scheduling pattern includes scheduling parameters having values identifying even and odd parameters of the generated parameters and specifying one of the two center stage switching elements for each of the odd parameters.

According to such scheduling patterns, connections associated with an even parameter are scheduled equally between the two center stage switching elements, while connections associated with an odd parameter are scheduled equally between the two center stage switching elements with a remaining connection being scheduled for the center stage switching elements specified in the scheduling pattern for the odd parameter.

The scheduling parameters of the scheduling pattern may be arranged in a pattern matrix having rows, columns, and arcs. Each row in the pattern matrix corresponds to connections originating from an input stage switching element. Each column corresponds to connections destined for an output stage switching element. Each arc corresponds to multicast connections originating from an input stage switching element and destined for both output stage switching elements. Alternative arrangements of the rows, columns, and arcs may also be implemented.

Even parameters may be represented in the pattern matrix by a zero (0), while odd parameters may be represented by a positive-1 (+1) or a negative-1 (−1). A +1 value indicates that an additional connection is scheduled for a first center stage switching element, while a −1 value indicates that an additional connection is scheduled for a second center stage switching element. In specific instances, the odd parameters may also be a positive-2 (+2) or a negative-2 (−2), indicating that two additional connections are scheduled to a particular center stage switching element.

In order to ensure that substantially equal numbers of connections originating from each input stage switching element and destined for each output stage switching element are scheduled for each center stage switching element, the sum of values from a row and an arc is constrained to be at most two, while the sum of values from a column and an arc is also constrained to be at most two.

The scheduling pattern may be generated by selecting a general pattern from two or more general patterns based on the parameters generated from the configured set of input/output connections and then generating the scheduling pattern from the general pattern and the generated parameters. Particular embodiments include generating an even/odd mask from the generated parameters; generating an index from the even/odd mask; selecting the general pattern from the two or more general patterns with the index; and multiplying elements of the mask with elements of the selected general pattern, resulting in the scheduling pattern.

Further embodiments of the invention include a scheduling algorithm that implements a method of incremental scheduling of input/output connections being added or removed in the multi-stage switch.

When adding a new connection, such embodiments include adding the connection to a first configured set of input/output connections including multicast connections, resulting in a second configured set of input/output connections. Temporary schedules are then generated for the two center stage switching elements from the second configured set of input/output connections according to a scheduling pattern in order to minimize the difference in the numbers of connections scheduled for the respective center stage switching elements that originate from a common input stage switching element and to minimize the difference in the numbers of connections scheduled for the respective center stage switching elements that are destined for a common output stage switching element, resulting in the non-blocking properties of the respective switching elements being retained. Scheduled connections for the two center stage switching elements are then rearranged using a limited number of rearrangements, such as six, matching the temporary schedules.

When removing a connection, such embodiments include removing a connection from a first configured set of connections, resulting in a second configured set of connections. Existing schedules for the two center stage switching elements are then obtained. The existing schedules are previously generated by the processor according to a scheduling pattern in order to minimize the difference in the numbers of connections scheduled for the respective center stage switching elements that originate from a common input stage switching element and to minimize the difference in the numbers of connections scheduled for the respective center stage switching elements that are destined for a common output stage switching element, resulting in the non-blocking properties of the respective switching elements being retained. A scheduled connection is then removed from one of the existing schedules that corresponds to the removed connection. The existing schedules are then rearranged using a limited number of rearrangements, such as six, to minimize a difference between the schedules.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 is an illustration of a prior art digital cross connect.

FIG. 2 is an implementation of a digital cross connect of FIG. 1.

FIG. 3 is an alternative implementation of the digital cross connect of FIG. 1.

FIG. 4 illustrates an example operation of the digital cross connect of FIG. 3.

FIG. 5 shows the configuration of FIG. 4 on an equivalent 3-stage S-S-S Clos network.

FIG. 11 is a flow diagram illustrating a process for incremental scheduling when adding a new connection according to one embodiment.

FIGS. 12A through 12E illustrate an example of the embodiment of FIG. 11.

DETAILED DESCRIPTION OF THE INVENTION

A description of preferred embodiments of the invention follows.

Embodiments of the invention include a scheduling algorithm that implements a method of scheduling connections in a multi-stage switch, resulting in less switching elements being required than known switching architectures to increase bandwidth and to retain the non-blocking properties of the constituent switching elements for incoming traffic, including multicast traffic. A scheduling algorithm is also provided that implements a method of incremental scheduling of connections being added or removed in a multi-stage switch.

Particular embodiments of the invention include a multi-stage switch with two input stage switching elements, two output stage switching elements, and two center stage switching elements coupling the two input stage switching elements to the two output stage switching elements. Each of the respective switching elements have non-blocking properties for incoming traffic, including multicast traffic. A processor coupled to at least the two center stage switching elements may implement a scheduling algorithm according to an embodiment of the invention.

Such embodiments schedule a configured set of input/output connections including multicast connections between the two center stage switching elements according to a scheduling pattern in order to minimize the difference in the numbers of connections scheduled for the respective center stage switching elements that originate from a common input stage switching element and to minimize the difference in the numbers of connections scheduled for the respective center stage switching elements that are destined for a common output stage switching element, resulting in the non-blocking properties of the respective switching elements being retained. According to one embodiment, each difference being minimized is at most two connections.

Further embodiments of the invention provide a method for incremental scheduling of connections with a limited number of rearrangements, resulting in rapid reconfiguration whenever connections are added or removed.

According to one embodiment, the three-stage switch network includes individual switching elements arranged in input, center, and output stages, such that the aggregate bandwidth of the switch network is double the aggregate bandwidth of an individual element. For example, if the aggregate bandwidth for each of the individual switching elements is 180 gigabits per second (180 Gb/s), the resulting aggregate bandwidth of the three-stage switch network is 360 Gb/s.

Figure 6:
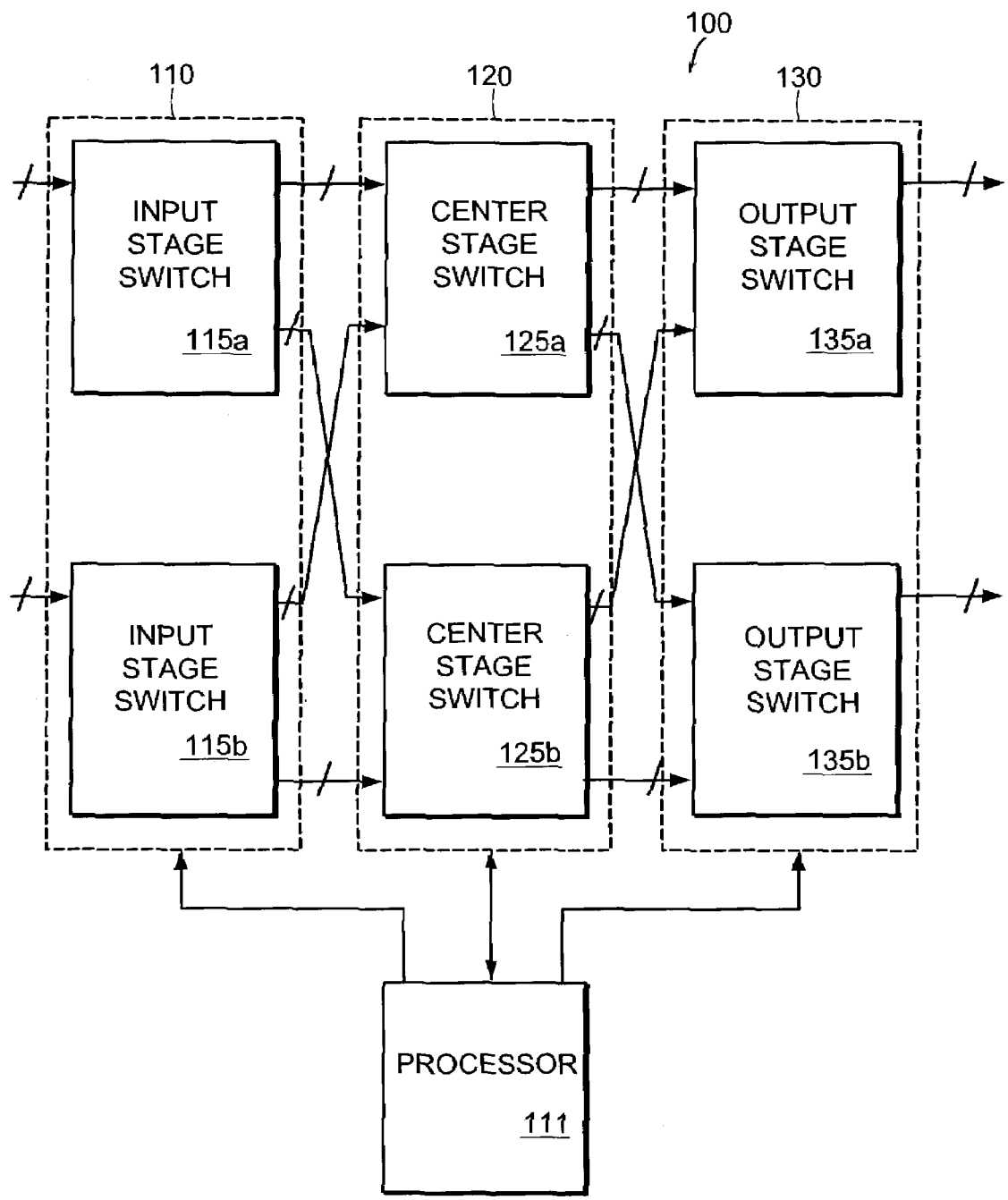
FIG. 6 is a three-stage grooming switch according to one embodiment.

FIG. 6 is a diagram illustrating a three-stage switch network of a grooming switch according to one embodiment. In this embodiment, six switching elements are interconnected, resulting in a bandwidth double that of an individual switching element. The network 100 is implemented in stages, including an input stage 110, a center stage 120, and an output stage 130. Each stage includes two switching elements with each element having a number of input ports and output ports. The switching elements of the center stage 125a, 125b couple the output ports of the input stage switching elements 115a, 115b to the input ports of the output stage switching elements 135a, 135b. In particular, each switching element of the center stage 125a, 125b is coupled to half of the output ports from each input stage switching element 115a, 115b and is coupled to half of the input ports to each output stage switching element 135a, 135b. A processor 111, coupled to at least the two center stage switching elements, performs a scheduling algorithm according to embodiments of the invention.

Each of the switching elements may be implemented with a Velio™ VC2002 SONET/SDH Grooming Switch. The Velio™ VC2002 Sonet/SDH Grooming Switch is an internal three-stage device having (i) 72 TSIs at an input stage, (ii) 96 space switches at a center stage, and (iii) 72 TSIs at an output stage. This switch is rearrangeably non-blocking for traffic up to a fanout of four (4). Fanout refers to the number of destinations associated with a particular connection. The VC2002 switch module can accept 72 STS-48 input streams and can generate 72 STS-48 output streams or 18 STS-192 output streams for an aggregate bandwidth of 180 Gb/s. The network 100 of VC2002 switch modules results in an aggregate bandwidth of 360 Gb/s, which is double that of an individual VC2002 switch module.

According to an alternative embodiment, each of the switching elements may be implemented with a Velio™ VC2105 SONET/SDH Grooming Switch, an internal single stage switching element that is strictly non-blocking for arbitrary multi cast (i.e. any fanout). The VC2105 switch module can accept 144 STS-48 input streams and can generate 144 STS-48 output streams or 36 STS-192 output streams for an aggregate bandwidth of 360 Gb/s. The network 100 of VC2105 switch modules results in an aggregate bandwidth of 720 Gb/s.

Figure 7:
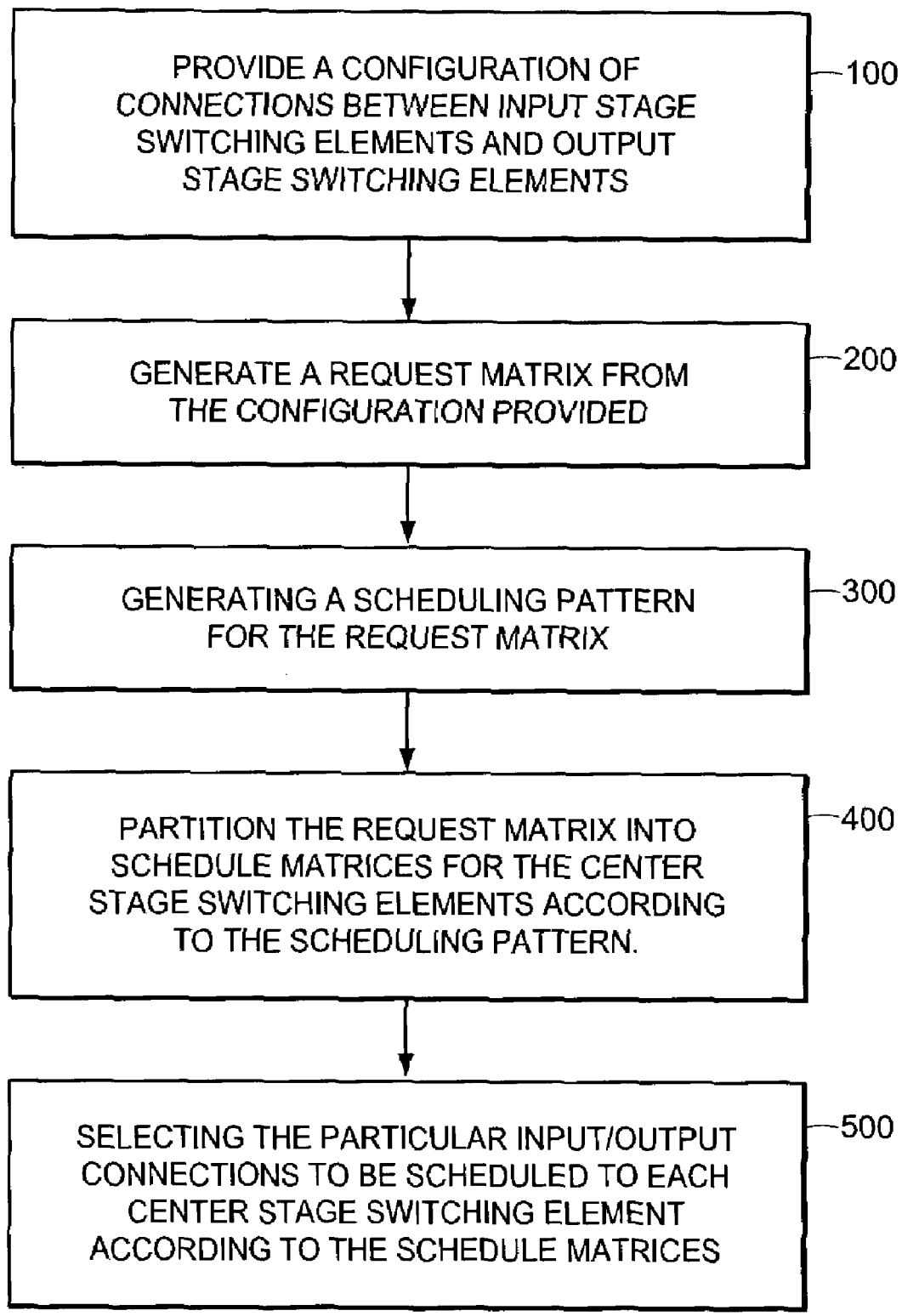
FIG. 7 is a flow diagram illustrating a method for scheduling connections across the three-stage grooming switch of FIG. 6 according to one embodiment.

FIG. 7 is a flow diagram illustrating a method for scheduling connections across the three-stage grooming switch of FIG. 6 according to one embodiment. This embodiment, referred to as "all-at once scheduling," results in a configured set of input/output connections being scheduled between the two center stage switching elements, minimizing the difference in the numbers of connections scheduled for the respective center stage switching elements that originate from a common input stage switching element and minimizing the difference in the numbers of connections scheduled for the respective center stage switching elements that are destined for a common output stage switching element.

At 100, a configuration defining the required connections between the input stage switching elements, 115a, 115b and the output stage switching elements 135a, 135b, typically referred to as permutations, is provided to the processor 111. A connection may be unicast or multicast. Multicast connections may include dualcast connections. A unicast connection specifies a single source and a single destination. For example, a unicast STS-1 connection may be defined by an input port/timeslot of an input stage switching element and an output port/timeslot of an output stage switching element. A multicast connection specifies a single source and multiple destinations. The destinations may terminate at the same output stage switching element or may be split between the two output stage switching elements 135a, 135b.

At 200, a set of parameters is generated from the configuration provided. Each parameter of the set specifies a number of connections from one of the input stage switching elements to at least one of the output stage switching elements. According to one embodiment, the set of parameters may be represented in a matrix, referred to as a request matrix.

Figure 8A:
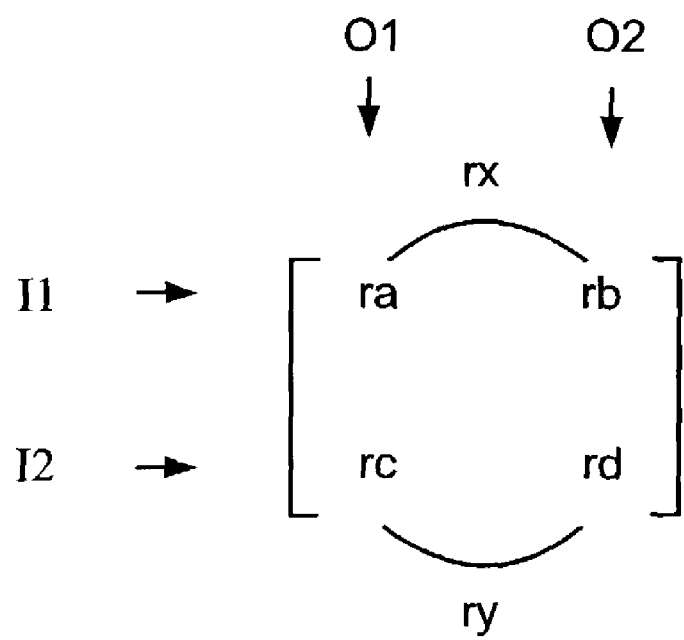
FIG. 8A is a pictorial representation illustrating an arbitrary request matrix according to one embodiment.

FIG. 8A is a pictorial representation illustrating an arbitrary request matrix according to one embodiment. In this embodiment, each row of the matrix corresponds to connections originating from a particular input stage switching element (i.e., I1 or I2), while each column of the matrix corresponds to connections destined for a particular output stage switching element (i.e., O1, O2). The arcs labeled rx and ry correspond to the connections originating from a particular input stage switching element with destinations at both output stage switching elements. The parameters of the request matrix (i.e., ra, rb, rc, rd, rx, and ry) specify the number of connections configured for a particular connection type, including unicast and multicast connections.

According to one embodiment, each of the parameters ra, rb, rc, and rd specifies the number of connections, including multicast connections, from a given input stage switching element to a given output stage switching element that are specified by the row and column for that parameter. For example, parameter ra specifies the number of connections originating from input stage switch I1 and destined for output stage switch O1. Parameters rx and ry are the number of dualcast or multicast connections from a given input stage switching element to both output stage switching elements. In this embodiment, parameters rx and ry specify the number of dualcast or multicast connections from input stage switching elements I1 and I2, respectively.

Any dualcast or multicast connection whose destinations are associated with a single output stage switching element may be treated as a unicast connection when generating the request matrix. Such connections are later fanned out upon reaching their output stage switching element.

Referring back to FIG. 7 at 300, a scheduling pattern is generated for the request matrix. The scheduling pattern includes a set of scheduling parameters that correspond to the parameters of the request matrix. Each scheduling parameter indicates how to partition the connections of a corresponding parameter of the request matrix. In particular, the pattern defines how each odd parameter of the request matrix is to be partitioned between the center stage switching elements 125a and 125b. According to one embodiment, the set of scheduling parameters is represented in a matrix, referred to as a pattern matrix.

Figure 8B:
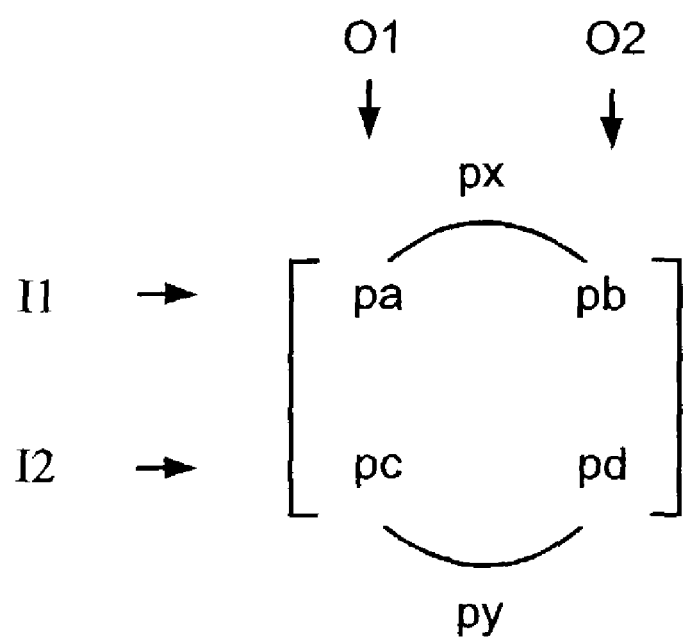
FIG. 8B is a pictorial representation of a pattern matrix determined for a request matrix according to one embodiment.

FIG. 8B is a pictorial representation of a pattern matrix determined for a request matrix according to one embodiment. Thus, scheduling parameter pa indicates how to partition request matrix parameter ra, and so on. The choice of a pattern for a particular request matrix is a function of which subset of the six parameters are odd numbers. Particular embodiments for determining a scheduling pattern for a particular request matrix are presented with reference to FIGS. 10A and 10B.

Referring back to FIG. 7 at 400, the request matrix is partitioned into two (2) center stage schedule matrices S1 and S2 according to the scheduling pattern. Each of the center stage schedule matrices includes a set of parameters that indicates the number of connections for each connection type (i.e., unicast and multicast) handled by the corresponding center stage switching element.

Figure 9:
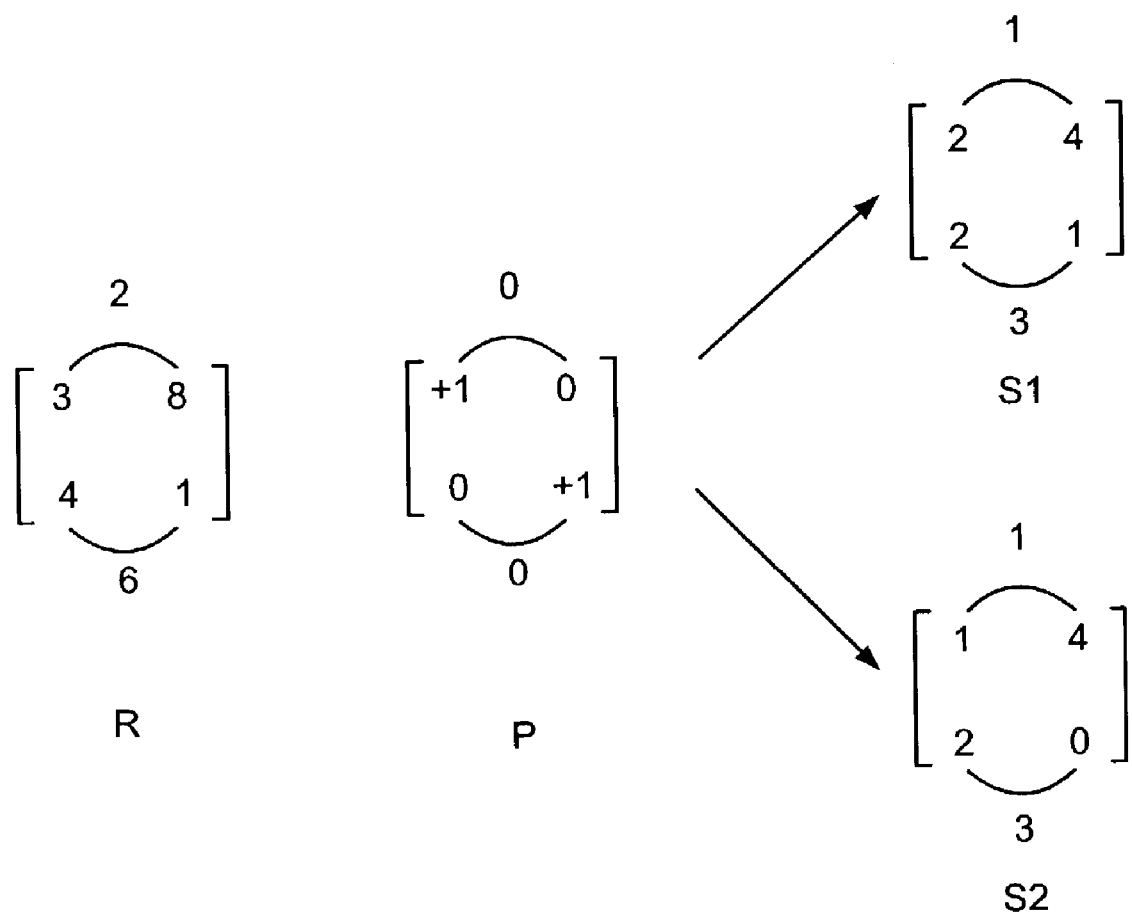
FIG. 9 is a pictorial representation illustrating an example for partitioning a request matrix into corresponding center stage schedule matrices using a scheduling pattern according to one embodiment.

FIG. 9 is a pictorial representation illustrating an example for partitioning a request matrix into corresponding center stage schedule matrices using a scheduling pattern according to one embodiment. Request matrix R has parameters (ra, . . . , ry), specifying the number of connections for each connection type as discussed with reference to FIG. 8A. Pattern matrix P has parameters, (pa, . . . ,py), specifying how to partition the parameters of matrix R. A zero "0" parameter in the pattern matrix indicates that a corresponding parameter in the request matrix is an even number, which should be divided by two (2). For example, in FIG. 9, parameter rb in matrix R is equal to 8, indicating the number of connections from input stage switch I1 to output stage switch O2. The corresponding scheduling parameter pb in matrix P is equal to 0, indicating that the connections of that type are to be split evenly between the two center stage switching elements. Thus, schedule matrices S1 and S2 each specify 4 connections of that type.

A plus-one ("+1") parameter in the pattern matrix indicates that a corresponding parameter in the request matrix is an odd number, which should be divided by two (2) and then rounded up. This corresponds to an "extra" connection being handled by the center stage switching element 125a to which the schedule matrix S1 pertains. For example, in FIG. 9, parameter pa in pattern matrix P is equal to +1, indicating that parameter ra in matrix R is to be divided by two and then rounded up for matrix S1. The remaining connections are allocated to matrix S2. Thus the corresponding parameters in matrices S1 and S2 are 2 and 1 respectively.

A minus-one ("−1") parameter in the pattern matrix (not shown) indicates that a corresponding parameter of the request matrix is an odd number, which should be divided by two (2) and then rounded down. This corresponds to an "extra" connection being handled by the alternate center stage switching element 125b to which the schedule matrix S2 pertains.

According to one embodiment, the general formula to determine the two center stage schedule matrices S1 and S2, is given by the following equations:

$$S1=(R+P)/2 \quad (1)$$

$$S2=(R-P)/2=R-S1 \quad (2)$$

where R is a given request matrix and P is the pattern matrix for R.

Referring back to FIG. 7 at 500, the center stage schedule matrices S1 and S2 are then used to select the particular input/output connections to be scheduled for each center stage switching element. This selection may be arbitrary, since each center stage scheduling matrix only indicates the numbers of connections to schedule to each center stage switching element. For switching elements that are implemented with internal switching architectures, such as the Velio™ VC2002 and the Velio™ VC2105 switches, further scheduling may be performed internally by each of the respective switching elements.

Referring back to FIG. 7 at 300, a scheduling pattern is generated for a request matrix. As previously stated, the scheduling pattern indicates a manner of partitioning the connections between the two center stage switching elements, minimizing the difference in the numbers of connections scheduled for the respective center stage switching elements that originate from a common input stage switching element and minimizing the difference in the numbers of connections scheduled for the respective center stage switching elements that are destined for a common output stage switching element. In this way, the switch network is able to maintain the non-blocking characteristics of its constituent switching elements, because each center stage switching element is scheduled substantially equal numbers of connections originating from each input stage switching element and destined for each output stage switching element.

According to one embodiment, the scheduling pattern must satisfy the requirement that the sum of entries in each row and column of pattern matrix P has a magnitude of at most 1. For example, in FIG. 9, the sum of entries in each row and column of P has a magnitude of at most one (1) (e.g., row parameters pa+pb+px=(+1)+(0)+(0)=+1).

The validity of such patterns is based on the following proof. Assume a request matrix R and an even number of inputs m (e.g., input port/timeslots) at each input stage switching element 115a, 115b. A scheduling parameter of pattern matrix P is odd if and only if its corresponding entry in the request matrix R is also odd. For schedule matrix S1=(R+P)/2, to be a valid schedule, each input and output (i.e., row and column) must have at most m/2 connections. For example, the number of connections originating from the first input stage switching element, I1, is considered as follows:

$$(ra+pa)/2+(rb+pb)/2+(rx+px)/2=(ra+rb+rx)/2+(pa+pb+px)/2$$

The term (ra+rb+rx)/2 is at most m/2 by construction and (pa+pb+px)/2 may have a magnitude of either 0 or ½. Their sum is never greater than m/2 because the pattern sum being ½ corresponds to an odd number of odd inputs m in the first row of request matrix R. In this case, ra+rb+rx is at most m−1 resulting in the overall sum being at most m/2.

In order to reduce the number of scheduling patterns that need to be stored corresponding to every conceivable request matrix, embodiments of the invention provide a method for generating a scheduling pattern from a general pattern.

Figure 10A:
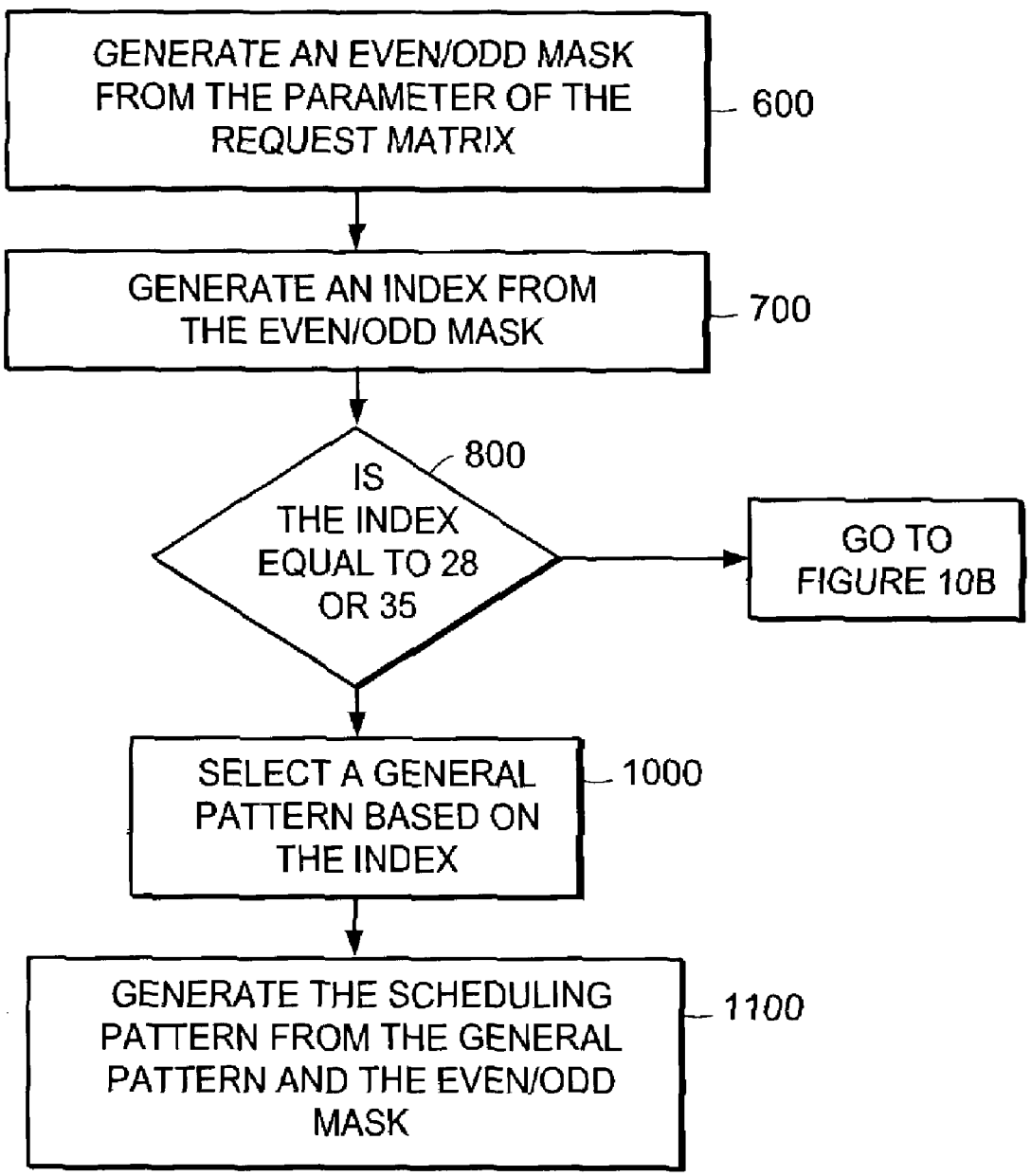
FIG. 10A is a flow diagram illustrating a process for generating a pattern scheduling for a request matrix according to one embodiment.

FIG. 10A is a flow diagram illustrating a process for generating a pattern scheduling for a request matrix according to one embodiment. In particular, the scheduling pattern is generated from one of a limited number of general patterns in order to reduce the total number of patterns required for all possible request matrices.

At 600, an even/odd mask is generated from the parameters of a given request matrix. According to one embodiment, the mask M is generated from the following:

$$M=(a \bmod 2, b \bmod 2, c \bmod 2, d \bmod 2, x \bmod 2, y \bmod 2)$$

This results in a mask that contains a corresponding entry that is one ("1") if the parameter is odd and zero ("0") if the parameter is even. For example, the even/odd mask for request matrix R of FIG. 9 is (1, 0, 0, 1, 0, 0).

At 700, an index is generated from the even/odd mask. According to one embodiment, each element of the mask M is treated as a bit in a binary number to create an index for that mask. Assuming a mask, M=(1, 0, 0, 1, 0, 0), with the first element of mask M representing the least significant bit, the corresponding index is equal to 9 (i.e., 1×1+2×0+4×0+ 8×1+16×0+32×0).

At 800, a determination is made as to whether the resulting index requires special processing described with reference to FIG. 10B in order to generate the scheduling pattern. According to one embodiment, the indices that require processing are 28 and 35. Assuming for now that the resulting index does not require special processing, the process proceeds to 1000.

At 1000, a general pattern is selected based on the index. According to one embodiment, there are three main general patterns as follows:

+1, −1, −1, +1, +1, −1                                            (1)

−1, +1, +1, −1, +1, −1                                            (2)

+1, +1, −1, −1, −1, +1                                            (3)

The following table identifies the general pattern to be selected for each of the 64 indices:

| General Pattern | Indices |
|---|---|
| 1 | 0-15, 16, 18, 20, 22, 23, 26, 30-32, 34, 39-43, 46-48, 50, 51, 55, 56, 58, 60, 62, 63 |
| 2 | 17, 21, 24, 25, 27, 29, 33, 36-38, 45, 49, 52, 53, 59, 61 |
| 3 | 19, 44, 54, 57 |

At 1100, the scheduling pattern specific to the particular request matrix is generated from the selected general pattern and the even/odd mask. According to one embodiment, the elements of M are multiplied by the corresponding elements of the general pattern to form the specific pattern. For example, if M=(1, 0, 0, 1, 0, 0) and the general pattern is (+1, −1, −1, +1, +1, −1), then the specific pattern is (+1, 0, 0, +1, 0, 0). FIG. 9 illustrates the specific pattern as a matrix P. Now, the pattern matrix P may be used to generate the center stage schedule matrices S1 and S2 as discussed with reference to FIG. 7.

In the special case where the resulting index is either 28 or 35, special processing must be performed to generate a scheduling pattern that will partition the connections, preventing the switch network from blocking. In each case, a series of tests are applied to the given request matrix until one is satisfied, resulting in a scheduling pattern being determined.

Figure 10B:
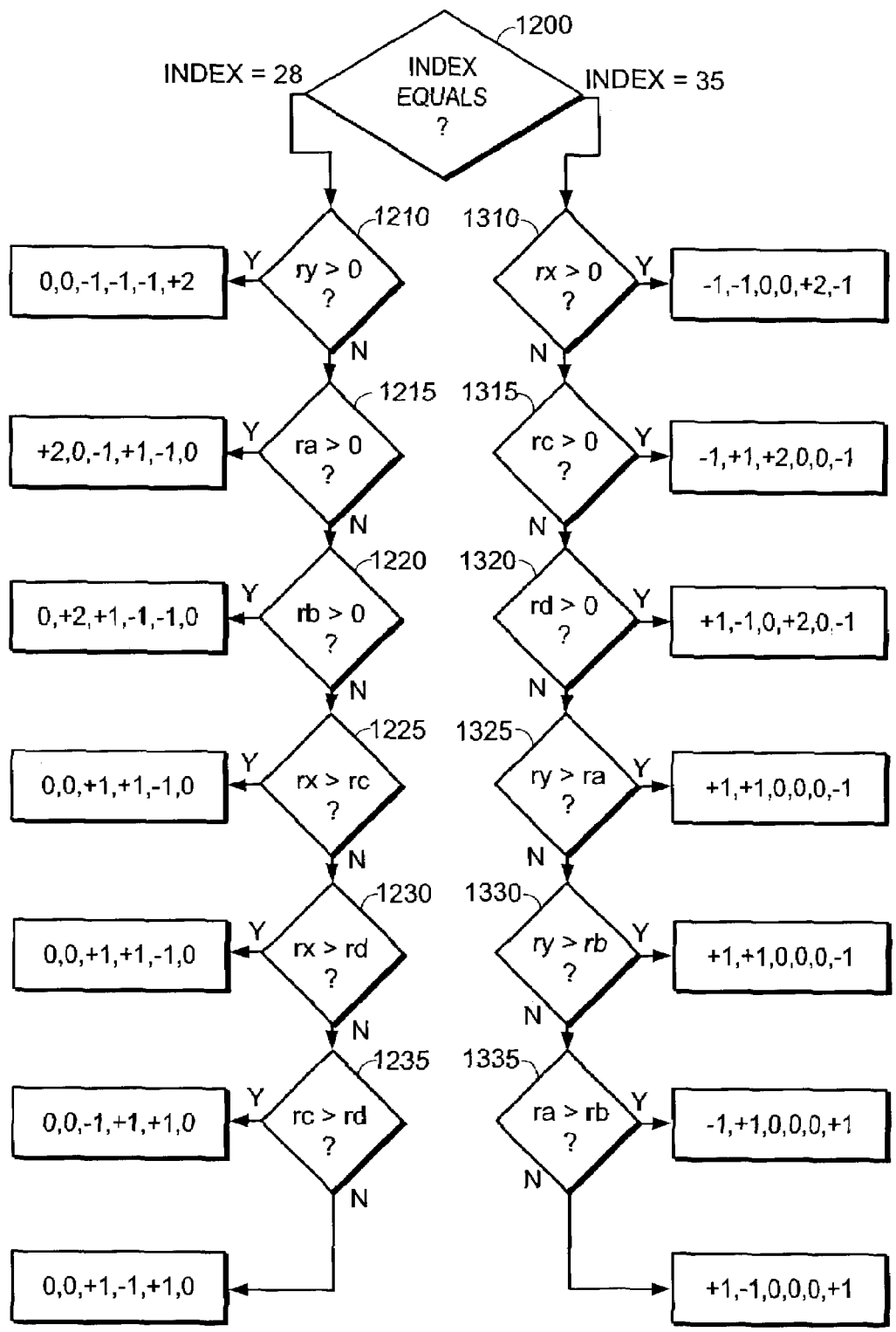
FIG. 10B is a flow diagram illustrating the special processing for particular request matrices according to one embodiment.

FIG. 10B is a flow diagram illustrating the special processing for particular request matrices according to one embodiment. At 1200, if the resulting index is equal to 28, the request matrix has parameters in which c, d, and x are odd. The process then starts at 1210 and continues until one of the tests is satisfied, resulting in a corresponding pattern being determined.

At 1210, if parameter y of the request matrix is non-zero, the scheduling pattern selected is (0, 0, −1, −1, −1 +2).

At 1215, if parameter a of the request matrix is non-zero, the scheduling pattern selected is (+2, 0, −1, +1, −1, 0).

At 1220, if parameter b of the request matrix is non-zero, the scheduling pattern selected is (0, +2, +1, −1, −1, 0).

At 1225, if parameter x is greater than parameter c of the request matrix, the scheduling pattern selected is (0, 0, +1, +1, −1, 0).

At 1230, if parameter x is greater than parameter d of the request matrix, the scheduling pattern selected is (0, 0, +1, +1, −1, 0).

At 1235, if parameter c is greater than parameter d, the scheduling pattern selected is (0, 0, −1, +1, +1, 0). Otherwise, the scheduling pattern selected is (0, 0, +1, −1, +1, 0). Since these patterns are not general patterns, no element-wise multiplication by the even/odd mask is performed. The selected pattern is utilized directly in the scheduling process of FIG. 7.

Referring back to FIG. 10B, at 1200, if the resulting index is equal to 35, the request matrix has parameters in which a, b, and y are odd. The process then starts at 1310 and continues until one of the tests is satisfied, resulting in a corresponding pattern being determined.

At 1310, if parameter x of the request matrix is non-zero, the scheduling pattern selected is (−1, −1, 0, 0, +2, −1).

At 1315, if parameter c of the request matrix is non-zero, the scheduling pattern selected is (−1, +1, +2, 0, 0, −1).

At 1320, if parameter d is non-zero, the scheduling pattern selected is (+1, −1, 0, +2, 0, −1).

At 1325, if parameter y is greater than parameter a, the scheduling pattern selected is (+1, +1, 0, 0, 0, −1).

At 1330, if parameter y is greater than parameter b of the request matrix, the scheduling pattern selected is (+1, +1, 0, 0, 0, −1).

At 1335, if parameter a is greater than parameter b of the request matrix, the scheduling pattern selected is (−1, +1, 0, 0, 0, +1). Otherwise, the scheduling pattern selected is (+1, −1, 0, 0, 0, +1). Again, the selected pattern is utilized directly in the scheduling process of FIG. 7.

INCREMENTAL SCHEDULING

From the input and output ports of embodiments of the three-stage switch network, a rearrangeable network is indistinguishable from a strictly non-blocking network if its configuration changes are (1) aligned to the start of a frame and (2) frame synchronized so that all of the individual switching elements switch their configurations at the start of the same frame. Such frame synchronized switching is referred to as hitless because it does not hit or corrupt the contents of any frames. There is no impact of rearranging existing connections as long as such rearrangement is hitless. Thus, in order to implement hitless switching, rearrangements of connections across the three-stage switch network must occur rapidly to ensure frame synchronized switching.

As connections are added to and deleted from a configuration of input/output connections, previous connections setup through the center stage switching elements may need to be rearranged in order to ensure continued non-blocking operation. Such rearrangements are reflected in adjustments to the center stage schedule matrices S1 and S2. Embodiments of the invention provide a method for incremental scheduling of connections, resulting in rapid rearrangement of connections through the center stage switching elements.

FIG. 11 is a flow diagram illustrating a process for incremental scheduling when adding a new connection according to one embodiment. FIGS. 12A through 12E illustrate an example of the embodiment of FIG. 11.

At 2000, a new connection is defined in the configuration from an input stage switching element F to one or more output stage switching elements T. The addition of the new connection to the configuration requires a timeslot to be allocated through one of the center stage switches At this point, existing connections are already partitioned according to center stage schedule matrices S1 and S2, as in FIG. 12A.

At 2010, a new request matrix R' is generated, that includes the new connection being added. The new request matrix R' may be generated from the prior request matrix R and incrementing the parameter corresponding to the type of connection added. For example, in FIG. 12B, parameter rx is incremented to 3 corresponding to an added dualcast or multicast connection originating from input stage switch I1. Alternatively, the new request matrix may be generated by adding the current center stage schedule matrices S1 and S2, such that corresponding parameters of each matrix are added together, and then incrementing the parameter corresponding to the new connection (F, T).

At 2020, two temporary center stage schedule matrices, S1' and S2', are generated from the new request matrix R' using the all-at-once scheduling algorithm described with reference to FIGS. 7 and 10A or 10B. At this point, no actual connections are moved or added. For example, FIG. 12C is a pictorial representation of temporary schedule matrices S1' and S2' generated from request matrix R'.

At 2030, a determination is made whether the parameter corresponding to connection (F, T) of the schedule matrix S1' is greater than the same parameter of the schedule matrix S1. If so, the current schedule matrix S1 is incremented with the new connection (F, T) at 2040. Otherwise, the current schedule matrix S2 is incremented with the new connection (F, T) at 2050. The steps at 2050 and 2040 perform the physical addition of the connection and update the schedule matrices S1 or S2 to reflect the new connection, respectively. In our continuing example, parameter sx of matrix S1 is 1 and parameter of sx of matrix S1' is 2. Thus, as illustrated in FIG. 12D, parameter sx of matrix S1 is incremented to 2 (step 2040).

The remaining steps of the incremental scheduling algorithm rearrange existing connections until the current configuration of the switch network matches the newly computed partitioning of schedule matrices S1' and S2'.

At 2060, if the current schedule matrix S1 is equal to the new schedule matrix S1', the incremental scheduling algorithm ends. Otherwise, the following steps are repeated until the above condition is satisfied.

At 2070, a pair of corresponding parameters from schedule matrices S1 and S1' are obtained. In our continuing example, parameter sa of S1 is 3, while parameter sa of S1' is 2.

At 2080, the parameter values obtained from schedule matrices S1 and S1' are compared. If the values are equal, no change to the current schedule matrices is performed and the process returns back to 2060. If the values are not equal, the process proceeds to 2090 to determine whether a connection needs to be added or removed from the center stage switching element corresponding to the schedule matrix S1 at 2090.

At 2090, if the parameter value obtained from schedule matrix S1 is less than the parameter value obtained from schedule matrix S1', the process proceeds to 2100, where the parameter value of S1 is incremented and the corresponding parameter value of S2 is decremented. Alternatively, if the parameter value of schedule matrix S1 is greater than the parameter value obtained from schedule matrix S1', the process proceeds to 2110, where the corresponding parameter value of S2 is incremented and the parameter value of schedule matrix S1 is decremented. In our continuing example, parameter sa of matrix S1 is greater than parameter sa of matrix S1'. Thus, as illustrated in FIG. 12E, parameter sa of matrix S1 is decremented to 2 and parameter sa of matrix S2 is incremented to 3.

This process repeats, walking through each parameter until the current schedule matrix S1 is equal to the new schedule matrix S1'.

Figure 13:
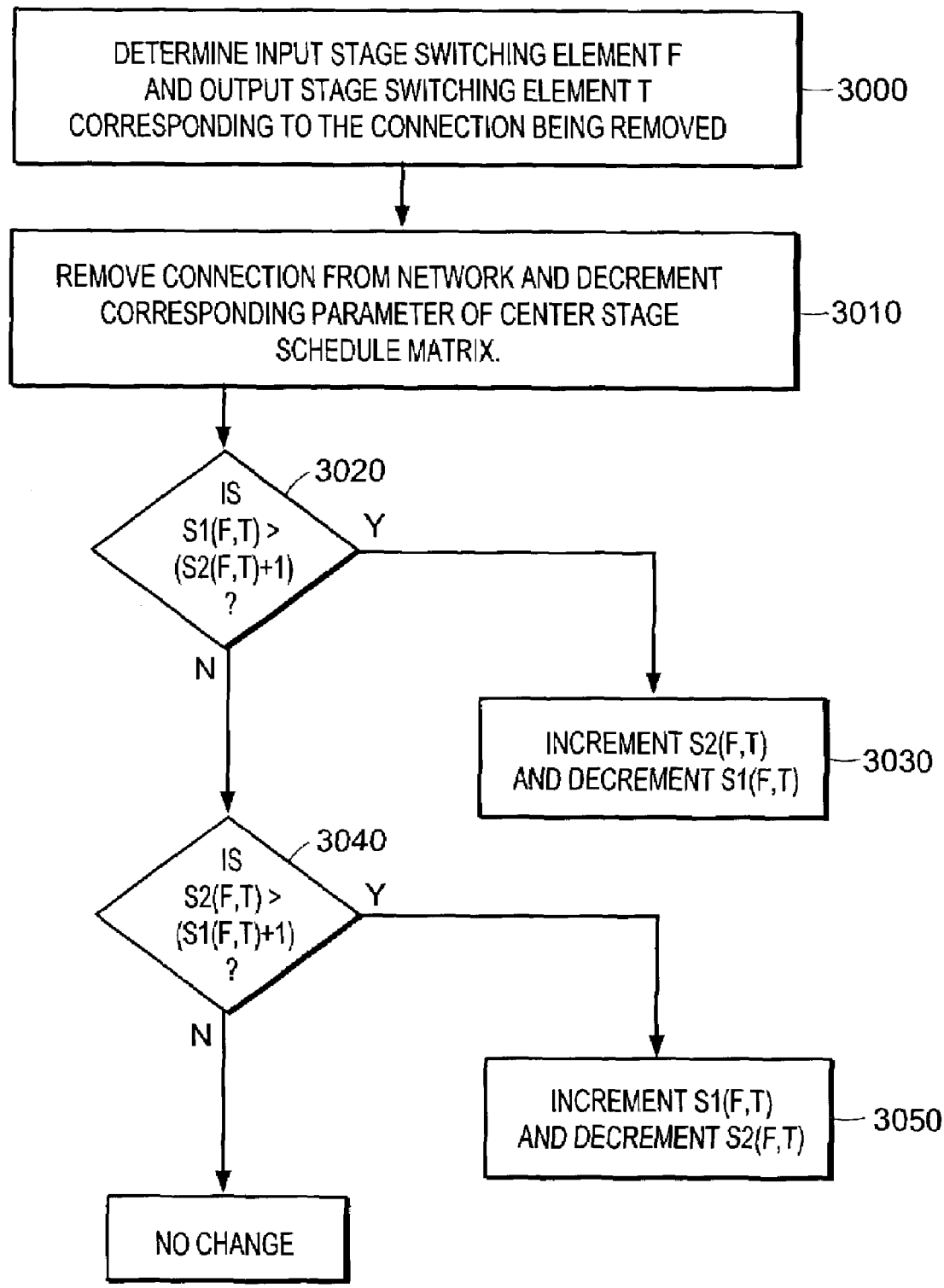
FIG. 13 is a flow diagram illustrating a process of incremental scheduling when removing an existing connection according to one embodiment.

FIG. 13 is a flow diagram illustrating a process of incremental scheduling when removing an existing connection according to one embodiment.

At 3000, the corresponding input stage and output stage switching elements F and T are determined for a specific connection being removed from the configuration.

At 3010, the physical connection is removed from the network, which also removes the connection from a corresponding center stage/switching element. The schedule matrix S1 or S2 is then updated to reflect this change.

At this point, the partitioning between the two center stage switching elements may need to be rebalanced. If so, any other connection from the same input stage and output stage switching elements as the removed connection is moved to the opposite center stage switching element. Such balancing maintains the difference between schedule matrices S1 and S2 to be small, such that the difference between a parameter in schedule matrix S1 and its corresponding parameter in schedule matrix S2 does not generally increase above one (1) connection.

In particular, at 3020, the value of the parameter of matrix S1 corresponding to the removed connection from input stage switch F to output stage switch T is compared with the corresponding parameter of matrix S2, which is incremented by one (1). If the parameter value of S1 is greater, then that S1 parameter is decremented and the S2 parameter incremented at 3030. If the parameter value of S1 is not greater, then the process proceeds to 3040.

At 3040, the converse is compared. In other words, the value of the parameter of matrix S2 corresponding to the removed connection is compared with the corresponding parameter of matrix S1, which is incremented by one (1). If the parameter value of S2 is greater, then that S2 parameter is decremented and the corresponding S1 parameter is incremented at 3050. If the parameter value of S2 is not greater, then no rearrangement of connections between the center stage switches is performed.

Figure 14A:
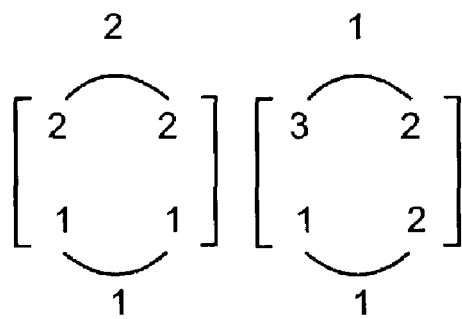
FIGS. 14A through 14C illustrate an example of the embodiment of FIG. 13.
Figure 14B:
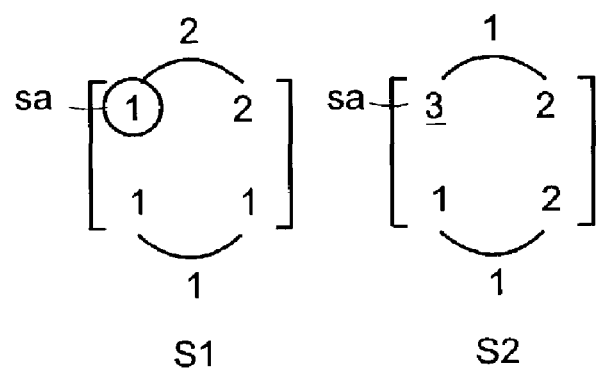
Figure 14C:
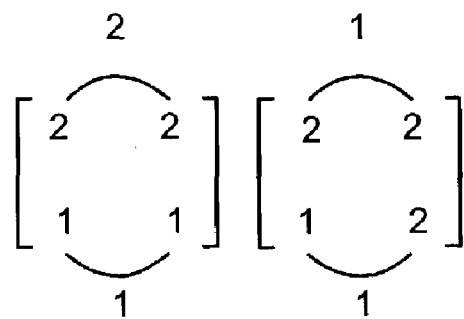

FIGS. 14A-14C are pictorial representations illustrating the embodiment of FIG. 13.

FIG. 14A illustrates the two center stage schedule matrices S1 and S2 prior to removal of a connection from the configuration of the switch network.

FIG. 14B illustrates the schedule matrix S1 with parameter sa decremented from 2 to 1 due to a removal of a connection from input stage switch I1 and output stage switch O1.

Referring back to FIG. 13 at 3020, parameter sa of matrix S1 is compared with parameter sa of matrix S2 incremented by one (1) (i.e. 1>4) Since this test is false, the process proceeds to 3040, at which parameter sa of matrix S2 is compared with parameter sa of matrix S1 incremented by one (1) (i.e. 3>2). Since this test is true, a connection is moved from matrix S2 by decrementing parameter sa of matrix S2 and incrementing parameter sa of matrix S1, as illustrated in FIG. 14C.

Now the total number of rearrangements needed to add a new connection can be bounded. First, the "misbalance" between S1 and S2 after adding a new connection is:

$$S1-S2=(R+P)/2-(R-P)/2=P$$

which is exactly the pattern used to make schedule. For example, when a new connection is requested, a new pattern P' and the corresponding S1' are computed. Existing connections are rearranged until the current connections are partitioned according to S1. For specific entry in S1, the maximum number of connections that need to be moved is the difference in the misbalance of that entry before adding a new connection and after. So, for example, if parameter sa had a misbalance of +1 before adding a new connection and a misbalance of −1 after, one connection was moved from S1 to S2 (the difference of 2 "swing" is from removing the connection from S1 and then adding it to S2).

The misbalance after removing some number of connections can also be expressed as a pattern. In this embodiment, because of the balancing action of the removal algorithm, the entries in this pattern will be at most one in magnitude. Since the removal algorithm can keep the magnitudes within one, the largest number of rearrangements possible is one for each parameter or six (6) total. This also applies to the rare cases where a +2 entry appears in the pattern because these cases always have an accompanying zero in the pattern, which balances out.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of scheduling connections in a multi-stage switch, the multi-stage switch comprising two input stage switching elements, two output stage switching elements, and two center stage switching elements coupling the two input stage switching elements to the two output stage switching elements, each of the respective switching elements having non-blocking properties for incoming traffic, including multicast traffic, the method comprising:
   scheduling a configured set of input/output connections including multicast connections between the two center stage switching elements according to a scheduling pattern in order to minimize a first difference in the numbers of connections from a common input stage switching element scheduled for the respective center stage switching elements and to minimize a second difference in the numbers of connections to a common output stage switching element scheduled for the respective center stage switching elements, resulting in the non-blocking properties of the respective switching elements being retained;
   generating parameters from the configured set of input/output connections, each of the parameters specifying a number of connections from one of the two input stage switching elements to at least one of the two output stage switching elements; and
   generating the scheduling pattern from the generated parameters, such that the scheduling pattern includes scheduling parameters having values identifying even and odd parameters of the generated parameters and specifying one of the two center stage switching elements for each of the odd parameters.

2. The method of claim 1, wherein the first difference and the second difference are each at most two.

3. The method of claim 1, further comprising:
   scheduling connections associated with an even parameter equally between the two center stage switching elements; and
   scheduling connections associated with an odd parameter equally between the two center stage switching elements with a remaining connection being scheduled for the one of the two center stage switching elements specified in the scheduling pattern for the odd parameter.

4. The method of claim 1, further comprising:
   arranging the scheduling parameters of the scheduling pattern in a pattern matrix having rows, columns, and arcs, such that a first sum of values from a row and an arc being at most two and a second sum of values from a column and an arc being at most two.

5. The method of claim 1, wherein generating the scheduling pattern from the generated parameters further comprises:
   selecting a general pattern from two or more general patterns based on the parameters generated from the configured set of input/output connections; and
   generating the scheduling pattern from the general pattern and the generated parameters.

6. The method of claim 5, wherein generating the scheduling pattern from the generated parameters further comprises:
   generating an even/odd mask from the generated parameters;
   generating an index from the even/odd mask;
   selecting the general pattern from the two or more general patterns with the index; and
   multiplying elements of the mask with elements of the selected general pattern, resulting in the scheduling pattern.

7. The method of claim 1, wherein the multicast connections include dualcast connections.

8. The method of claim 1, wherein the incoming traffic includes SONET data streams.

9. A method of incremental scheduling connections in a multi-stage switch, the multi-stage switch comprising two input stage switching elements, two output stage switching elements, and two center stage switching elements coupling the two input stage switching elements to the two output stage switching elements, each of the respective switching elements having non-blocking properties for incoming traffic, including multicast traffic, the method comprising:
   adding a connection to a first configured set of input/output connections including multicast connections, resulting in a second configured set of input/output connections;
   generating temporary schedules for the two center stage switching elements from the second configured set of connections according to a scheduling pattern in order to minimize a first difference in the numbers of connections from a common input stage switching element scheduled for the respective center stage switching elements and to minimize a second difference in the numbers of connections to a common output stage switching element scheduled for the respective center stage switching elements, resulting in the non-blocking properties of the respective switching elements being retained;
   rearranging scheduled connections for the two center stage switching elements using a limited number of rearrangements to match the temporary schedules;
   generating parameters from the second configured set of input/output connections, each of the parameters specifying a number of connections from one of the two input stage switching elements to at least one of the two output stage switching elements; and
   generating the scheduling pattern from the generated parameters, such that the scheduling pattern includes scheduling parameters having values identifying even and odd parameters of the generated parameters and specifying one of the two center stage switching elements for each of the odd parameters.

10. The method of claim 9, wherein the limited number of rearrangements is at most six rearrangements.

11. A method of incremental scheduling connections in a multi-stage switch, the multi-stage switch comprising two input stage switching elements, two output stage switching elements, and two center stage switching elements coupling the two input stage switching elements to the two output stage switching elements, each of the respective switching elements having non-blocking properties for incoming traffic, including multicast traffic, the method comprising:
  removing a connection from a first configured set of connections, resulting in a second configured set of connections;
  obtaining existing schedules for the two center stage switching elements, the existing schedules being previously generated according to a scheduling pattern in order to minimize a first difference in the numbers of connections from a common input stage switching element scheduled for the respective center stage switching elements and to minimize a second difference in the numbers of connections to a common output stage switching element scheduled for the respective center stage switching elements, resulting in the non-blocking properties of the respective switching elements being retained;
  removing a scheduled connection from one of the existing schedules of the two center stage switching elements that corresponds to the removed connection;
  rearranging the existing schedules of the two center stage switching elements using a limited number of rearrangements to minimize a difference between the schedules;
  generating parameters from the second configured set of input/output connections, each of the parameters specifying a number of connections from one of the two input stage switching elements to at least one of the two output stage switching elements; and
  generating the scheduling pattern from the generated parameters, such that the scheduling pattern includes scheduling parameters having values identifying even and odd parameters of the generated parameters and specifying one of the two center stage switching elements for each of the odd parameters.

12. The method of claim 11, wherein the limited number of rearrangements is at most six rearrangements.

13. A multi-stage switch, comprising:
  two input stage switching elements;
  two output stage switching elements;
  two center stage switching elements coupling the two input stage switching elements to the two output stage switching elements, each of the respective switching elements having non-blocking properties for incoming traffic, including multicast traffic;
  a processor scheduling a configured set of input/output connections including multicast connections between the two center stage switching elements according to a scheduling pattern in order to minimize a first difference in the numbers of connections from a common input stage switching element scheduled for the respective center stage switching elements and to minimize a second difference in the numbers of connections to a common output stage switching element scheduled for the respective center stage switching elements, resulting in the non-blocking properties of the respective switching elements being retained, wherein (i) the processor generates parameters from the configured set of input/output connections, each of the parameters specifying a number of connections from one of the two input stage switching elements to at least one of the two output stage switching elements and (ii) the processor generates the scheduling pattern from the generated parameters, such that the scheduling pattern includes scheduling parameters having values identifying even and odd parameters of the generated parameters and specifying one of the two center stage switching elements for each of the odd parameters.

14. The switch of claim 13, wherein the first difference and the second difference are each at most two.

15. The switch of claim 13, wherein:
  the processor schedules connections associated with an even parameter equally between the two center stage switching elements; and
  the processor schedules connections associated with an odd parameter equally between the two center stage switching elements with a remaining connection being scheduled for the one of the two center stage switching elements specified in the scheduling pattern for the odd parameter.

16. The switch of claim 13, wherein:
  the processor arranges the scheduling parameters of the scheduling pattern in a pattern matrix having rows, columns, and arcs, such that a first sum of values from a row and an arc being at most two and a second sum of values from a column and an arc being at most two.

17. The switch of claim 13, wherein the processor generates the scheduling pattern from the generated parameters further includes:
  the processor selecting a general pattern from two or more general patterns based on the parameters generated from the configured set of input/output connections; and the processor generating the scheduling pattern from the general pattern and the generated parameters.

18. The switch of claim 17, wherein the processor generates a scheduling pattern from the generated parameters further includes:
  the processor generating an even/odd mask from the generated parameters;
  the processor generating an index from the even/odd mask;
  the processor selecting the general pattern from the two or more general patterns with the index; and
  the processor multiplying elements of the mask with elements of the selected general pattern, resulting in the scheduling pattern.

19. The switch of claim 13, wherein the multicast connections include dualcast connections.

20. The switch of claim 13, wherein the incoming traffic includes SONET data streams.

21. A multi-stage switch, comprising:
  two input stage switching elements;
  two output stage switching elements;
  two center stage switching elements coupling the two input stage switching elements to the two output stage switching elements, each of the respective switching elements having non-blocking properties for incoming traffic, including multicast traffic;
  a processor adding a connection to a first configured set of input/output connections including multicast connections, resulting in a second configured set of input/output connections;
  the processor generating temporary schedules for the two center stage switching elements from the second configured set of connections according to a scheduling pattern in order to minimize a first difference in the numbers of connections from a common input stage switching element scheduled for the respective center stage switching elements and to minimize a second difference in the numbers of connections to a common output stage switching element scheduled for the respective center stage switching elements, resulting in the non-blocking properties of the respective switching elements being retained, wherein (i) the processor generates parameters from the second configured set of input/output connections, each of the parameters specifying a number of connections from one of the two input stage switching elements to at least one of the two output stage switching elements and (ii) the processor generates the scheduling pattern from the generated parameters, such that the scheduling pattern includes scheduling parameters having values identifying even and odd parameters of the generated parameters and specifying one of the two center stage switching elements for each of the odd parameters; and the processor rearranging scheduled connections for the two center stage switching elements using a limited number of rearrangements to match the temporary schedules.

22. The switch of claim 21, wherein the limited number of rearrangements is at most six rearrangements.

23. A multi-stage switch, comprising:

two input stage switching elements;

two output stage switching elements;

two center stage switching elements coupling the two input stage switching elements to the two output stage switching elements, each of the respective switching elements having non-blocking properties for incoming traffic, including multicast traffic;

a processor removing a connection from a first configured set of connections including multicast traffic, resulting in a second configured set of connections;

the processor obtaining existing schedules for the two center stage switching elements, the existing schedules being previously generated by the processor according to a scheduling pattern in order to minimize a first difference in the numbers of connections from a common input stage switching element scheduled for the respective center stage switching elements and to minimize a second difference in the numbers of connections to a common output stage switching element scheduled for the respective center stage switching elements, resulting in the non-blocking properties of the respective switching elements being retained, wherein (i) the processor generates parameters from the second configured set of input/output connections, each of the parameters specifying a number of connections from one of the two input stage switching elements to at least one of the two output stage switching elements and (ii) the processor generates the scheduling pattern from the generated parameters, such that the scheduling pattern includes scheduling parameters having values identifying even and odd parameters of the generated parameters and specifying one of the two center stage switching elements for each of the odd parameters;

the processor removing a scheduled connection from one of the existing schedules of the two center stage switching elements that corresponds to the removed connection; and the processor rearranging the existing schedules of the two center stage switching element the schedules using a limited number of rearrangements to minimize a difference between the schedules.

24. The switch of claim 23, wherein the limited number of rearrangements is at most six rearrangements.

25. A multi-stage switch, comprising:

two input stage switching elements;

two output stage switching elements;

two center stage switching elements coupling the two input stage switching elements to the two output stage switching elements, each of the respective switching elements having non-blocking properties for incoming traffic, including multicast traffic;

a scheduling means coupled to at least the two center stage switching elements, the scheduling means scheduling a configured set of input/output connections including multicast connections between the two center stage switching elements according to a scheduling pattern in order to minimize a first difference in the numbers of connections from a common input stage switching element scheduled for the respective center stage switching elements and to minimize a second difference in the numbers of connections to a common output stage switching element scheduled for the respective center stage switching elements, resulting in the non-blocking properties of the respective switching elements being retained, wherein (i) the scheduling means generates parameters from the configured set of input/output connections, each of the parameters specifying a number of connections from one of the two input stage switching elements to at least one of the two output stage switching elements and (ii) the scheduling means generates the scheduling pattern from the generated parameters, such that the scheduling pattern includes scheduling parameters having values identifying even and odd parameters of the generated parameters and specifying one of the two center stage switching elements for each of the odd parameters.

26. The switch of claim 25, wherein the limited number of rearrangements is at most six rearrangements.

\* \* \* \* \*